United States Patent [19]

Griffiths et al.

[11] 3,900,891

[45] Aug. 19, 1975

[54] ROTATING-HEAD MANDREL WITH CAM SURFACE

[75] Inventors: Donald E. Griffiths; Clement H. Kalthoff; Edward G. Laenen, all of Boulder, Colo.

[73] Assignee: International Business Machines Corporation, Armonk, N.Y.

[22] Filed: Dec. 26, 1973

[21] Appl. No.: 428,143

[52] U.S. Cl. .................. 360/84; 360/102; 360/104; 360/107

[51] Int. Cl.².... G11B 5/48; G11B 5/54; G11B 5/60

[58] Field of Search ....... 360/84, 130, 71, 102, 104, 360/122, 107; 226/199, 155

[56] References Cited

UNITED STATES PATENTS

| | | | |
|---|---|---|---|
| 3,333,753 | 8/1967 | Streets | 360/84 |
| 3,378,646 | 4/1968 | Shashoua et al. | 360/84 |
| 3,428,524 | 2/1969 | Wilcox et al. | 360/84 |
| 3,504,136 | 3/1970 | Maxey | 360/102 |
| 3,564,158 | 2/1971 | Horton | 360/130 |
| 3,636,275 | 1/1972 | Sato et al. | 360/130 |

*Primary Examiner*—Alfred H. Eddleman
*Attorney, Agent, or Firm*—Homer L. Knearl

[57] ABSTRACT

A rotating head mandrel is contoured so that in cross-section the mandrel appears similar to the shape of an eyeball. Two mandrels are axially aligned for supporting a tape helically wrapped about the mandrels. Between the two mandrels is a rotor carrying a magnetic head. The magnetic tape helically wraps the two mandrels in the region of the rotor. The path of the rotating head relative to the tape is a transverse track at an acute angle to the longitudinal direction of the tape. The peak of the eyeball contour or cam shape contour of the mandrel is located at the entry and exit points of the tape as it helically wraps the mandrels. The peak gives the tape additional height relative to the rotating head and prevents the head from nicking the edge of the tape as it crosses the edges of the helically wrapped tape. The surfaces of the mandrels have holes through which air may be forced to provide a hydrostatic air bearing between the tape and the mandrels. The pattern of the holes on the mandrels is selected to support the tape in a uniform manner during helical wrap of the tape about the mandrels.

7 Claims, 3 Drawing Figures

ROTATING-HEAD MANDREL WITH CAM SURFACE

BACKGROUND OF THE INVENTION

This invention relates to rotating head magnetic tape recorders. More particularly, the invention relates to mandrels for supporting magnetic tape along a helical path so that a rotating head mounted between the mandrels may traverse the magnetic tape.

A typical configuration for rotating head magnetic tape recorder is two fixed mandrels separated by a rotor carrying a magnetic head. The mandrels are axially aligned with the rotor, and the tape is helically wrapped about the mandrels along the path of the rotor. Thus the head carried by the rotor will scan across the tape at an acute angle.

A problem associated with this magnetic tape transport configuration is that the magnetic head carried by the rotor protrudes above mandrel surfaces and as it passes across the edges of the tape, it hits the edges of the tape causing undue wear on both the head and the tape. In the past this problem of the head nicking the edges of the tape has been solved in one configuration by making sure that the edges of the tape do not cross the rotor region of the mandrels. Thus the head, instead of crossing the edges of the tape, comes up underneath the tape and exits underneath the tape. Rotating head transports have kept the tape away from the rotor region of the mandrel by shortening the wrap of the tape about the mandrel to something less than 360°. When approaching 360° wrap the solution to the problem is to provide external guides to hold the tape off the mandrel in the rotor region.

While these solutions to the problem are workable, they contain some disadvantages. For example, shortening the angle of wrap about the mandrels and thus the rotor may require that the rotor carry more than one magnetic head so as to minimize the amount of wasted rotation time when a single magnetic head would not be scanning across tape. In those cases where the angle of wrap approaches 360° and guide posts are used to bring the tape on and off the mandrel above the path of the rotating head, tape flutter will occur between the guide posts and the actual entry point of the tape at the mandrel. This region of unsupported tape between guide posts and mandrel being unstable creates two problems. The flutter of the tape in this region can cause damage to the tape and excessive wear to the mandrels. Further, the instability in the tape at this point can create read/write recording problems for the head as it begins or ends its scan path across the tape.

It is an object of this invention to stably support the tape as it enters and leaves the surface of a rotating head mandrel, and at the same time prevent the tape from being struck at its edge by the rotating magnetic head.

SUMMARY OF THE INVENTION

In accordance with this invention the above object has been accomplished by shaping the cylindrical surface of the mandrel with an additional cam surface to form an eyeball cross-sectional shape. This shape lifts the tape above the rotating head as the edge of the tape crosses the rotor region. In addition, the cam surface is only a small variation from the cylindrical surface of the mandrels so that the transition between the cam surface and the cylindrical surface of the mandrels is relatively smooth to provide uniform support of the tape as it wraps mandrels. In other words, the transition from the radius of the cam surface to the radius of the cylindrical surface is so slight that the tape is essentially supported during its entire wrap of the mandrel starting from the peak of the cam surface where the tape enters the mandrel. Lift given the tape by the cam shape prevents the rotating head from hitting the edge of the tape as it crosses under the edge of the tape.

The mandrel and the cam surface on the mandrel are air bearing to support the tape away from their surfaces. The air bearing is hydrostatic as the mandrels are fixed and do not rotate. The hydrostatic bearing is achieved by a pattern of holes in the surface of the mandrels through which air is forced. The hole pattern on each mandrel is triangularly shaped because the tape helically wraps the mandrels and moves from one mandrel across the rotor region to the other mandrel.

The air bearing is physically achieved by providing air plenum channels in the core of the mandrel and wrapping a foil about the mandrel that contains the holes for the air bearing. The holes align with the channelized plenum in the core of the mandrel.

The great advantage of this invention is that it permits 360° wrap of the tape about a mandrel and at the same time solves the problem of rotating head nicking the edge of the tape. Further, uniform support is provided by the mandrel as the tape moves from the cam surface or lifting region to the cylindrical surface or scanning region. Because of this uniform support on the mandrel, there is no tendency of the tape to flutter as it moves from the lifting region smoothly onto the scanning region of the mandrel.

CROSS-REFERENCE TO RELATED APPLICATION

Application Ser. No. 428,144 entitled "Cam Surface Mandrel with Air Bearing Support" by E. G. Laenen et al., filed concurrently herewith and assigned to the same assignee as the present application, claims a separate invention which was a direct outgrowth of the basic invention claimed in this application. Although the embodiments originally considered for utilizing the invention claimed in this application differed from the Laenen et al. invention, the Laenen et al invention is considered to set forth the best mode presently contemplated for implementing the invention claimed herein. Therefore, the preferred embodiment described herein is substantially the same as that set forth in the Laenen et al application.

DETAILED DESCRIPTION

Figures 1, 2, 3:
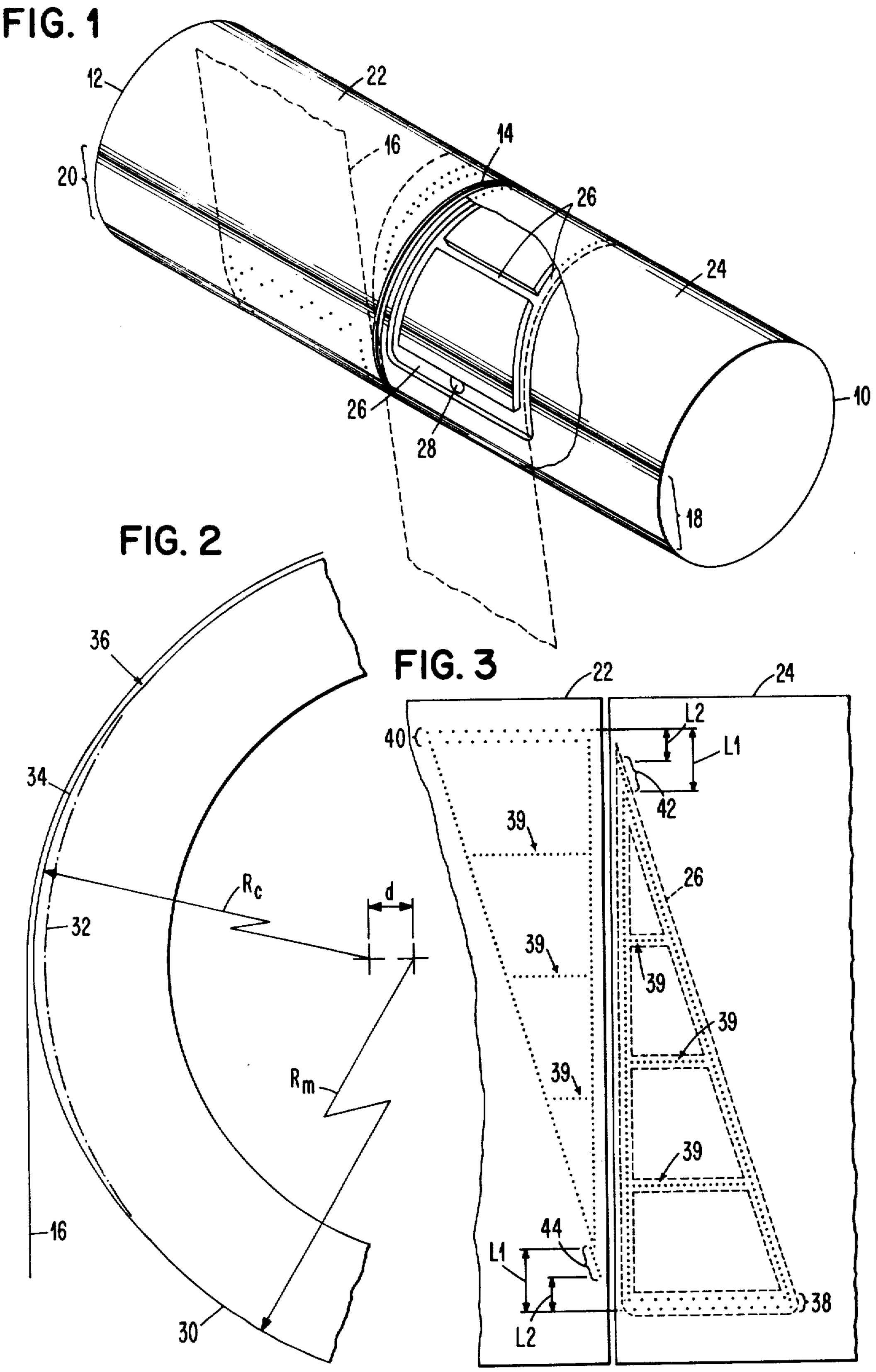
FIG. 1 shows mandrels in accordance with the invention having a cam surface as a part of each mandrel at the entry and exit regions of the tape helically wrapped about the mandrels.
FIG. 2 is a cross-section of a portion of a mandrel showing the eyeball shape given the mandrel by the additional cam surface on the mandrel.
FIG. 3 shows the pattern of holes in the foils that wrap the mandrels to provide the final outer surface of the mandrels.

Mandrels 10 and 12 in FIG. 1 are co-axially mounted with a rotor 14 carrying a magnetic head not shown. Tape 16 is shown in phantom as it helically wraps mandrels 10 and 12 and crosses the region of the rotor 14. The cam surfaces 18 and 20 of the mandrels 10 and 12 are represented by the shade lines that bracket the cam surfaces.

Tape 16 enters the mandrel 10 near the peak of cam surface 20. The first row of air bearing holes on the mandrels would be aligned with the entry and exit points of tape 16 on the mandrels 10 and 12.

A portion of the hole pattern in foil 22 attached to mandrel 12 can be seen. Foil 24 attached to mandrel 10 has been cut away to reveal a portion of the channelized air plenum 26 in the core of mandrel 10. Air to the air plenum would be provided from inside the mandrel 10 and enter the channel through ports 28 located at various positions in the air plenum channels 26.

From FIG. 1 it is clear that the tape 16 is supported by cam surfaces 18 and 20 in the rotor region where the rotating head would be crossing edges of the tape. Thus the cam surfaces 18 and 20 hold the tape above the path of the rotating head so that the rotating head will not crash into the edge of tape. The uniform support of the tape as it moves along the cam surfaces 18 and transitions to the cylindrical surfaces of the mandrels 10 and 12 is more clearly shown by the cross-section of the man drels illustrated in FIG. 2.

In FIG. 2 the basic cylindrical surface 30 for cutaway portion of the mandrel is shown. Dashed line 32 shows the cylindrical contour that the mandrel would have if the cam surface were not present. Cam surface 34 protrudes above the normal cylindrical surface of the mandrel.

Tape 16 is shown entering or exiting the mandrel surface at the peak of the cam surface 34. Tape 16 flies above the cam surface and the cylindrical surface 30 because of the hydrostatic air bearing provided in the mandrel. The transition between the cam surface 34 and the cylindrical surface 30 at region 36 is so slight that the support of tape 16 is essentially uniform from cam surface 34 to cylindrical surface 30. Therefore, there is no tendency for the tape to flutter as it moves from the cam surface 34 to the cylindrical surface 30.

The eyeball shape that the cam surface 34 gives the mandrel can be accomplished in a variety of ways. As depicted in FIG. 2, a radius for the cam surface $R_c$ is slightly smaller than the cylindrical surface radius of the mandrel $R_m$. In addition, the center-point for the radii must be offset by a distance *d* to achieve the eyeball shape. However achieved, the significance of the cam surface 34 is that it should be higher than the cylindrical surface of the mandrel and should provide a relatively slight or smooth transition between its surface and the cylindrical surface 30 of the mandrel.

In FIG. 3 a portion of the two foils 22 and 24 is shown. Foils 22 and 24 have been unwrapped from the mandrel and lain flat so as to see the entire hole pattern. Channels 26 of FIG. 1 are shown in dashed lines in FIG. 3. A similar set of channels (not shown) exists in mandrel 12 under foil 22. The significance of the hole pattern is that an air bearing is provided along the edges of the tape and along the rotor path. Also, rows 39 of holes are placed at intervals inside the triangular hole pattern. Extra holes are provided at region 38 of foil 24 where the tape enters the mandrel and region 40 of foil 22 where the tape exits the mandrel. These additional holes provide strong air bearing support to hold the tape off the cam surfaces as it enters and exits the mandrel.

Also extra holes are provided at regions 42 and 44 on foils 24 and 22 respectively. These extra holes provide extra air bearing support for the edge of the tape as it transitions across the rotor region, so that the tape fly height is consistent from tape edge to edge. Without the extra holes at 42 and 44, the edge of tape would be unsupported for a length L1. With the additional holes at 42 and 44, the edge of tape is only unsupported for length L2, which is very nearly only half of the length L1. This enhances the stability of the tape in the rotor region as the edge of tape crosses the rotor.

Foils 22 and 24 are attached to the mandrels 10 and 12 respectively to provide the final outside surface of the mandrels. The foils are positioned so that the outermost row of holes at regions 38 and 40 lie near the peak of the cam surfaces 18 and 20 respectively. The foils may be attached to the mandrels 10 and 12 by an adhesive bond.

It will be appreciated by one skilled in the art that various modifications might be made to the cam surface and the hole pattern without departing from the spirit of the invention. As just described, the function of the cam surface is to uniformly support the tape away from the rotor as the head transitions across edges of the magnetic tape. It will further be appreciated by one skilled in the art that other changes in form and details may be made without departing from the spirit and scope of the invention.

What is claimed is:

1. On a cylindrical mandrel for supporting tape wrapped about the mandrel in the region of a rotor carrying a magnetic head, the improvement comprising:

a cam surface superimposed on the cylindrical surface of the mandrel, said cam surface being shaped so that, in planar cross-section perpendicular to the axis of the mandrel, the mandrel with cam surface resembles the cross-sectional shape of an eyeball sectioned from front to back;

said cam surface lifting the tape away from the rotating magnetic head as the head crosses the edge of tape;

said cam surface uniformly supporting the length of tape crossing the cam surface of the mandrel to the cylindrical portion of the surface of the mandrel so that tape flutter as the tape transitions from said cam surface to the cylindrical surface of the mandrel is minimized.

2. The mandrel of claim 1, and in addition, means for generating a hydrostatic air bearing between the tape and both the cam surface and the cylindrical surface of the mandrel.

3. The mandrel of claim 2 wherein said generating means comprises:

a surface foil wrapping the mandrel to provide the outer surface of the mandrel, said foil having holes therein along the helical path of the magnetic tape; and plenum means in the core of the mandrel for supplying pressurized air through the holes in said foil so that the hydrostatic air bearing is generated.

4. Mandrels for supporting magnetic tape wrapped about the mandrels with a rotor mounted between the mandrels carrying a magnetic head, each of said mandrels comprising:

a cylindrical surface about a portion of the circumference of the mandrel along which said magnetic head protrudes above the surface of the mandrel and transduces information onto or off of the magnetic tape;

a cam surface about the remainder of the circumference of the mandrel, said cam surface having a peak higher than the protrusion of said magnetic head above said cylindrical surface and gradually decreasing in height until intersecting said cylindrical surface; and the portion of tape where the tape edges cross the path of the rotating magnetic head being in the region of said cam surface so that the magnetic tape is lifted above the rotating head as the head moves under the edges of the tape.

5. The mandrels of claim 4 wherein said cam surface has a cylindrical radius of curvature less than the radius of said cylindrical surface, the axis of the cam surface radius is parallel to the axis of the cylindrical surface, and the axis of the cam surface is displaced a short distance from the axis of the cylindrical surface.

6. The mandrels of claim 4, and in addition, a hydrostatic air bearing configured to helically wrap the mandrels along the path of the tape.

7. The mandrels of claim 6 wherein said hydrostatic air bearing comprises a foil wrapping each mandrel with holes in the foil along the helical path of the tape and a source of air under pressure inside the mandrels under the holes in each foil.

* * * * *